United States Patent
Grenz et al.

[11] Patent Number: 6,164,175
[45] Date of Patent: *Dec. 26, 2000

[54] METHOD AND ARRANGEMENT FOR OPERATING ROTATING STARTING SHEARS

[75] Inventors: Günter Grenz, Meerbusch; Klaus Küppers, Erkrath; Otmar Palzer, Jüchen, all of Germany

[73] Assignee: SMS Schloemann-Siemag Aktiengesellschaft, Düsseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/914,873
[22] Filed: Aug. 18, 1997

[30] Foreign Application Priority Data

Aug. 19, 1996 [DE] Germany ............ 196 33 308

[51] Int. Cl.⁷ .................................... B23D 25/02
[52] U.S. Cl. .................... 83/37; 83/72; 83/295; 83/296; 83/311
[58] Field of Search .................... 83/37, 72, 74, 83/285, 295, 296, 311

[56] References Cited

U.S. PATENT DOCUMENTS

| | | | |
|---|---|---|---|
| 3,759,117 | 9/1973 | Munchbach | 74/681 |
| 3,811,354 | 5/1974 | Ito | 83/320 |
| 4,771,667 | 9/1988 | Forman et al. | 83/100 |
| 4,926,728 | 5/1990 | Kawabata | 83/251 |

FOREIGN PATENT DOCUMENTS

| | | |
|---|---|---|
| 3020084 | 12/1981 | Germany . |
| 3042171 | 6/1982 | Germany . |

*Primary Examiner*—Lee Young
*Attorney, Agent, or Firm*—Friedrich Kueffner

[57] ABSTRACT

A method and an arrangement for operating a rotating starting shear operating in a start-stop operation on rolling stock travelling at different speeds in wire mills, light-section mills, medium plate mills and billet mills, wherein the shear, whose gear system is connected through a coupling to a drive motor, is accelerated from the position of rest to approximately rolling speed and, after the cut has been carried out, is stopped again. A gear mechanism is arranged between the gear unit of the shear and the drive motor, wherein torsion-proof couplings are arranged between the gear unit of the shear and the gear mechanism and between the gear mechanism and the drive motor.

6 Claims, 3 Drawing Sheets

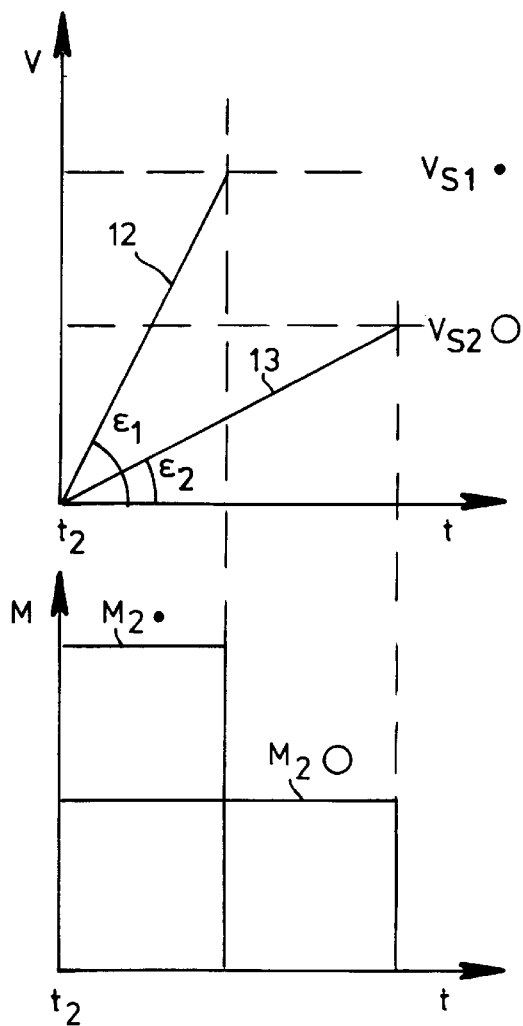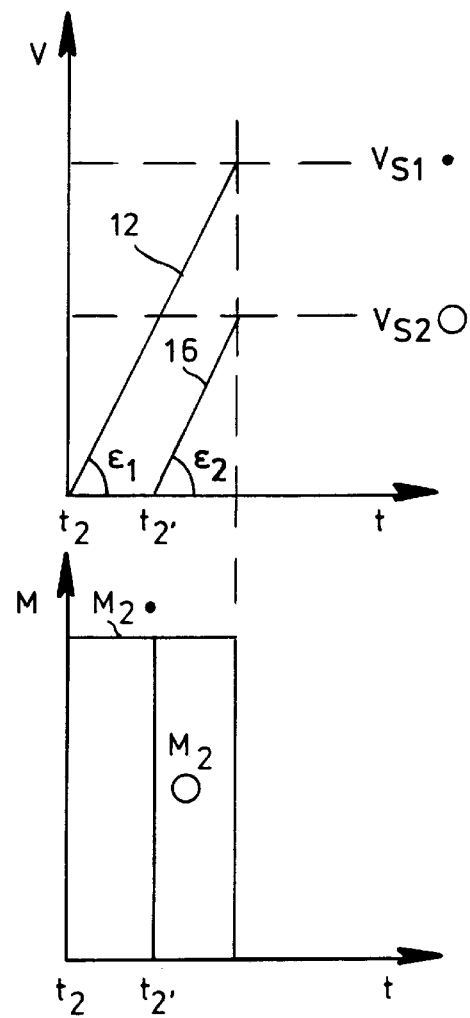

METHOD AND ARRANGEMENT FOR OPERATING ROTATING STARTING SHEARS

BACKGROUND OF THE INVENTION

1. Field of the Invention

The present invention relates to a method and an arrangement for operating a rotating starting shear operating in a start-stop operation on rolling stock travelling at different speeds in wire mills, light-section mills, medium plate mills and billet mills, wherein the shear, whose gear system is connected through a coupling to a drive motor, is accelerated from the position of rest to approximately rolling speed and, after the cut has been carried out, is stopped again.

2. Description of the Related Art

It is important in the operation of shears of this type that the shear knives have at least during the cut such a circumferential speed that it coincides with the exit speed of the rolling stock to be cut, because otherwise the cut could not be carried out properly and problems in the operation would occur.

Conventional shears, for example, the drum shears described in German patent applications 30 20 084 A1 and 30 42 171 A1, have two knife drums which are commonly driven by a motor through a gear arrangement. In such shears, which must cover a large range of speeds, this has the following disadvantages:

a) High rates of rotation of the motor occur in the case of high rolling stock speeds with thin rolling stock. The available high kinetic energy in the cutting area is not required, but inevitably leads to the requirement of a high drive power in spite of the low cutting work required.

b) In the case of low speeds of the rolling stock and thick rolling stock, the rates of rotation of the motor for the shear are also low. The low kinetic energy available in the cutting area frequently is not sufficient for carrying out the cutting work. Therefore, for eliminating this difficulty, it is necessary to select a larger motor with an appropriately higher drive power, which means that the motor is overdimensioned in the case of thin rolling stock and high rolling stock speeds.

Another disadvantage of drives constructed in this manner is the fact that the cut is carried out only after the respectively required maximum shear speed has been reached, which means that the maximum motor torque is not available at the beginning of the cut. Consequently, the rate of rotation of the motor initially drops and the desired rate of rotation and the maximum motor torque are only reached again toward the end of the cut.

SUMMARY OF THE INVENTION

Therefore, it is the primary object of the present invention to further develop the known starting shears described above in such a way that the disadvantages mentioned above are avoided and that it is made possible to carry out an optimum cut at the maximum motor torque at different rolling stock speeds and with different rolling stock cross-sections.

In accordance with the present invention, a gear mechanism is arranged between the gear unit of the shear and the drive motor, wherein torsion-proof couplings are arranged between the gear unit of the shear and the gear mechanism and between the gear mechanism and the drive motor.

The method according to the present invention is carried out by: starting the shear with a low drive torque over a short period of time which is required for eliminating the play of the gear unit and the coupling, generally over a period of time of about 10 ms; subsequently carrying out a constant acceleration of the shear with maximum inclination and maximum acceleration torque to the desired speed of the shear for all rolling stock speeds and rolling stock cross-sections, wherein the desired speed of the shear is selected greater than the speed of the rolling stock (leading shear); and beginning the cut prior to reaching the desired speed of the shear at a time at which the shear speed is already greater than the speed of the rolling stock; and automatically monitoring the circumferential speed of the shear knives during the cut in order to maintain an optimum lead of the shear.

The arrangement according to the present invention of a gear mechanism between the gear unit of the shear and the drive motor each connected through a torsion-proof coupling makes it possible to select a small step-up operation in the range of operation with high rolling stock speeds and small rolling stock cross-sections, and a greater step-up operation at slow rolling stock speeds and greater rolling stock cross-sections. This feature according to the present invention makes it possible for the first time to control the starting shear with the successive work steps described above:

a) Starting the shear with a low drive torque which corresponds approximately to 10% of the rated torque, during the short period of time which is required for eliminating the play of the gear unit and the coupling. The duration of the start-up depends on the size of the play of the gear unit and the coupling and is about 10 ms. This measure according to the present invention prevents a high impact load on the shear shortly after the start-up; the impact-free start-up of the shear substantially suppresses additional vibrations and overloads of the shear mechanism and the service life of the parts transmitting forces is significantly increased.

b) Constant acceleration of the shear after the start-up with maximum inclination and maximum acceleration torque to the desired speed of the shear for all rolling stock speeds and rolling stock cross-sections, wherein the desired shear speed is selected greater than the speed of the rolling stock (leading shear). Consequently, the full acceleration torque is available already at the beginning of the cut even in the case of large rolling stock cross-sections which require increased torques for cutting.

c) Beginning the cut shortly before reaching the desired speed of the shear at a point in time at which the shear speed is already greater than the speed of the rolling stock, in order to ensure that the full acceleration torque is available already at the beginning of the cut. This measure according to the present invention makes it possible that when the rate of rotation drops no time is lost for again building up this torque and the drop of the rate of rotation itself is also minimized.

d) Automatic monitoring and controlling of the circumferential speed of the shear knives during the cut in order to maintain an optimum lead of the shear. The automatic monitoring of the circumferential speed of the shear knives during the cut makes it possible in a simple and quick manner for the operator of the shear to evaluate in the case of problems, for example, when bending of the rod tips occurs, whether the speed of the shear knives is the reason of this problem as a result of a drop in the rate of rotation and, in this manner, the operator is able to determine more quickly the actual reason for the problem.

The control of the circumferential speed of the shear knives during the cut for obtaining an optimum shear lead is carried out manually by the operator, for example, on the bases of acoustic signals and/or visual signals which are triggered by the speed monitoring device, or the control is effected automatically by a control unit which, for this purpose, is connected through lines to the monitoring device and the drive motor.

The features and measures according to the present invention, which are based on arranging a gear mechanism between the gear unit of the shear and the drive motor, makes it possible to carry out a shear control which can be adapted in an optimum manner to different rolling stock cross-sections and rolling stock speeds.

In accordance with another advantageous development of the invention, for adjusting the desired of the shear to the maximum acceleration of the shear, the starting time of the shear is shifted in such a way that the desired constant maximum acceleration can be maintained with a changed acceleration distance.

In order to prevent heating of the shear knives by the rolling stock in the case of short acceleration distances, another feature of the present invention provides that the shear knives wait in an advantageous waiting position prior to the cut and prior to the acceleration.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 5 is a speed/time diagram only for the acceleration phase of the shear in accordance with the prior art;

FIG. 6 is a torque/time diagram only for the acceleration phase of the shear in accordance with the prior art;

FIG. 7 is a speed/time diagram only for the acceleration phase of the shear with the intermediate arrangement of a gear mechanism; and FIG. 8 is a torque/time diagram only for the acceleration phase of the shear with the intermediate arrangement of a gear mechanism.

DETAILED DESCRIPTION OF THE PREFERRED EMBODIMENTS

Figure 1:
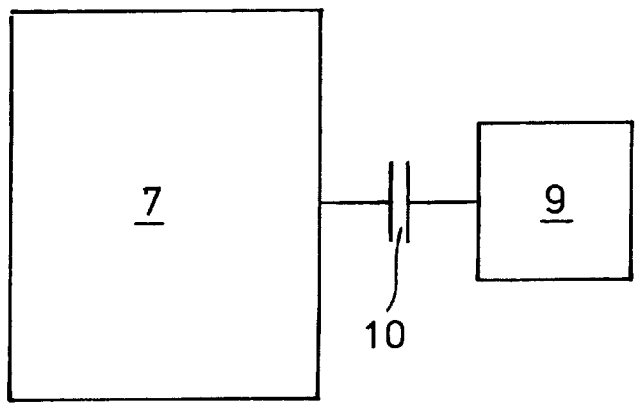
FIG. 1 is a diagram schematically showing the arrangement of the shear drive according to the prior art.

FIG. 1 of the drawing schematically shows the arrangement of the drive of a shear as it is described in German patent application 30 20 084. The drive motor 9 is coupled directly to the gear unit 7 of the shear through a torsion-proof coupling 10.

Figure 2:
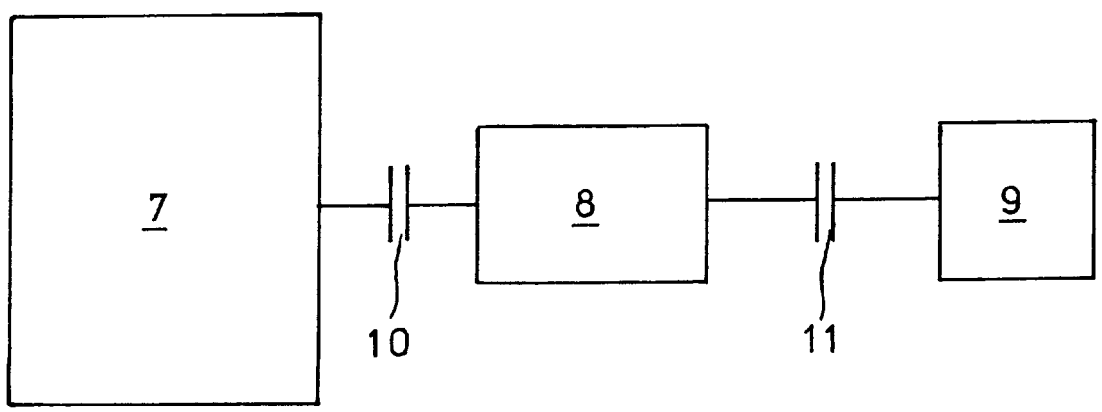
FIG. 2 is a diagram showing the arrangement of a gear mechanism between the drive of the shear and the gear unit of the shear.

As shown in FIG. 2, in accordance with the present invention a gear mechanism 8 is arranged between the gear unit 7 of the shear and the drive motor 9, wherein the gear mechanism 8 is connected to the gear unit 7 of the shear through a torsion-proof coupling 10 and to the drive motor 9 through a torsion-proof coupling 11. Independently of the rolling stock speed and the rolling stock cross-section, the measure according to the present invention makes it possible to control the shear in an optimum manner with the following steps:

starting the shear;
accelerating the shear; and
cutting the rolling stock.

Figure 3:
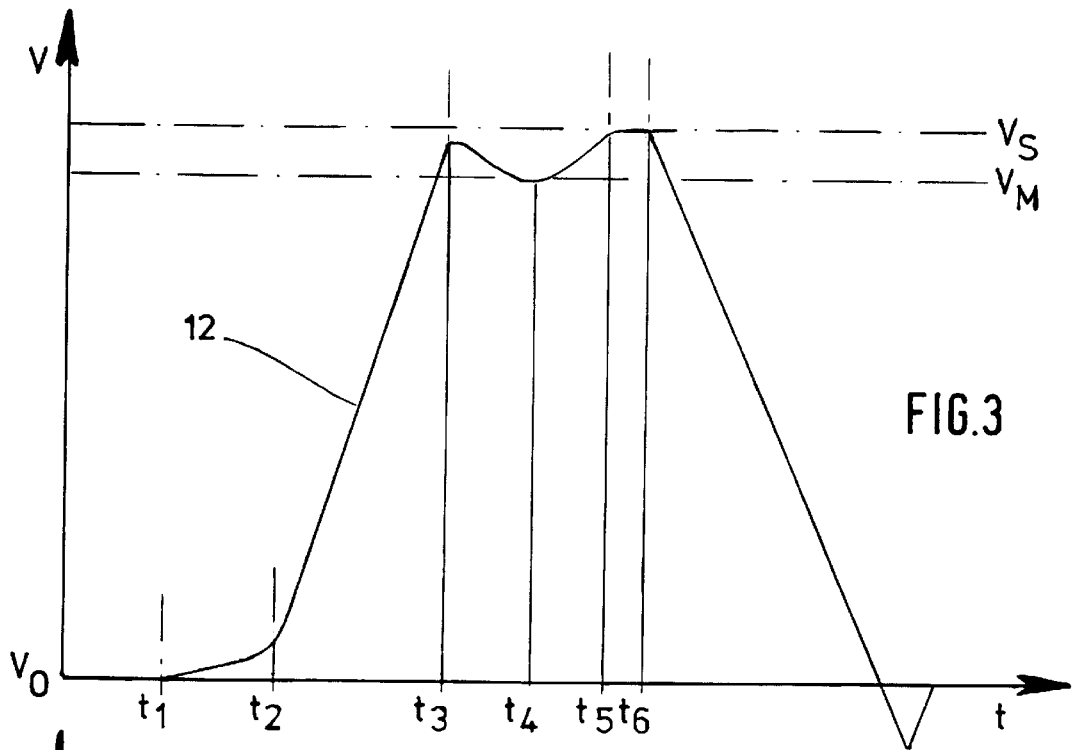
FIG. 3 is a speed/time diagram for the entire cutting process.
Figure 4:
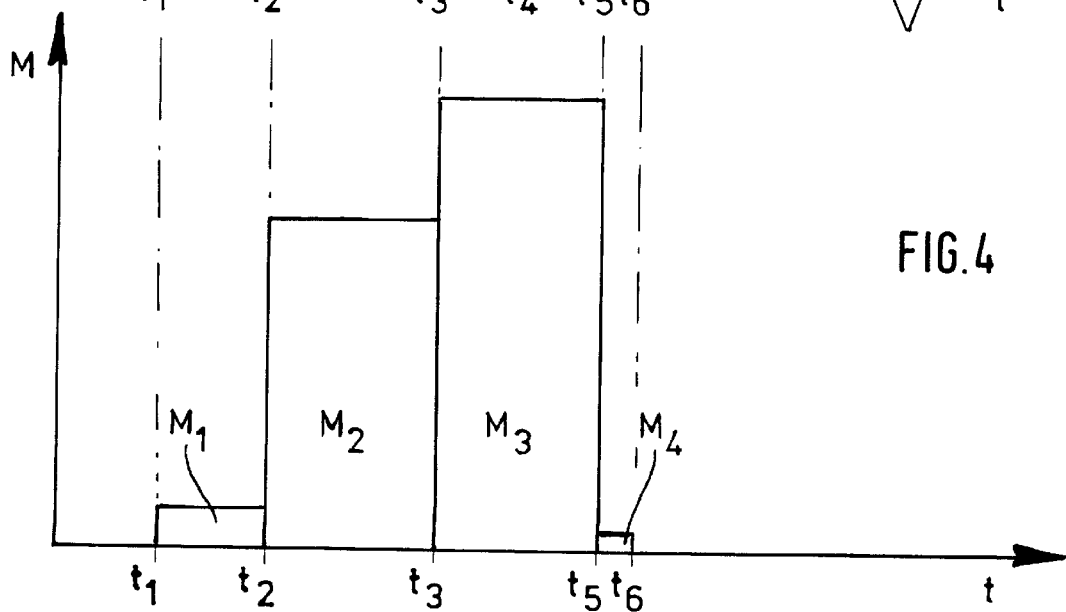
FIG. 4 is a torque/time diagram for the entire process.

The control in accordance with the present invention is illustrated in the embodiment of FIGS. 3 and 4 in the form of a speed/time diagram (FIG. 3) and a torque/time diagram (FIG. 4).

Beginning with the start-up of the shear at $t_1$, the shear is slowly accelerated with the torque $M_1$ until the play of the gear unit and the coupling is eliminated. Subsequently, the start of the maximum acceleration follows at $t_2$ at constant inclination with the acceleration torque $M_2$, independently of the rolling stock speed and the rolling stock cross-section, until the beginning of the cut at $t_3$. At the beginning of the cut, the shear speed is already above the rolling stock speed $V_M$, but still below the desired speed $V_s$ of the shear. The small drop in the rate of rotation at the beginning of the cut occurring at $t_4$ is minimized by applying the maximum torque $M_3$ and the shear is further accelerated until the desired speed $V_s$ of the shear is reached at $t_5$. The torque which then has to be applied until the end of the cut at $t_6$ is very small and is indicated by $M_4$ in FIG. 4.

The advantages of the measures and features according to the present invention are demonstrated in FIGS. 5 through 8 in which the acceleration phases of the shear are shown for two different rolling stock speeds and rolling stock cross-sections. For small rolling stock cross-sections, the symbol of a small dot (.) was selected, and for large rolling stock cross-sections, the symbol of a large circle (O) was selected.

FIGS. 5 and 6 of the drawing show the start-up of the shear as it is conventional in accordance with the prior art. Starting at the beginning of the acceleration at $t_2$, a steep acceleration path 12 with the angle $E_1$ results for the high speed $V_{s1}$ and with a small rolling stock cross-section (.), and a less inclined acceleration path 13 with the smaller angle $E_2$ results for the slow speed $V_{s2}$O with a larger cross-section (O). With the same starting points $t_2$ and equally long acceleration paths (112=13), this results in a maximum acceleration torque $M_2$. for the small rolling stock cross-section (.), while the acceleration torque $M_2$O for the large cross-section (O) is significantly lower.

In FIGS. 7 and 8 of the drawing, using the same rolling stock cross-sections and shear speeds of FIGS. 5 and 6, those acceleration paths and the resulting torques are illustrated which are produced when a gear mechanism is arranged between the gear unit of the shear and the drive motor.

With respect to the high speed $V_{s1}$ and the small rolling stock cross-section (.), nothing changes as compared to the example of FIGS. 5 and 6. On the other hand, in the case of the low speed $V_{s2}$O and the large rolling stock cross-section (O), a shifted starting time $t_2'$ results with the same inclination $E_1=E_2$, in a significantly reduced acceleration path 16, wherein 16 is smaller than 12, and a maximum acceleration torque $M_2$O exactly as in the case of the small rolling stock cross-section (.).

Accordingly, the intermediate arrangement of a gear mechanism in the drive line of the shear makes it possible, independently of the required shear speed and the rolling stock cross-section, to accelerate the shear always with a maximum acceleration torque, so that the full torque is available at the beginning of the cut and an optimum cut is ensured without significant drop in the rate of rotation.

The invention is not limited by the embodiments described above which are presented as examples only but can be modified in various ways within the scope of protection defined by the appended patent claims.

We claim:

1. A method of operating a rotating starting shear operated in a start-stop operation on rolling stock travelling at different speeds in a rolling mill, the starting shear having shear knives and a gear unit coupled to a drive motor, wherein the shear is accelerated from a position of rest to approximately the speed of the rolling stock and, after a cut has been carried out, the shear is stopped again, a gear mechanism being arranged between the gear unit and the drive motor of the shear, wherein the gear mechanisms is connected to the gear unit of the shear through a torsion-proof first coupling and the gear mechanism is connected to the drive motor through a torsion-proof second coupling, the method comprising carrying out the following steps:

(a) starting the shear with a low drive torque over a short period of time required for eliminating play of the gear unit and the couplings, subsequently (b) carrying out a constant acceleration of the shear with maximum acceleration torque to a desired speed of the shear independently of rolling stock speeds and rolling stock cross-sections, shifting a starting point of the acceleration of the shear in dependence on the rolling stock speed and the rolling stock cross-section, wherein the (desired speed of the shear is selected greater than the speed of the rolling stock, (c) beginning the cut shortly prior to reaching the desired speed of the shear at a point in time at which the shear speed is already greater than the speed of the rolling stock; and (d) automatically monitoring a circumferential speed of the shear knives during the cut in order to maintain an optimum lead of the shear.

2. The method according to claim 1, wherein the shear is started with a drive torque corresponding to about 10% of a rated torque.

3. The method according to claim 1, wherein step (a) is carried out for a period of time of about 10 ms.

4. The method according to claim 1, comprising utilizing measurement signals obtained by the monitoring of the circumferential speed of the shear knives for controlling the circumferential speed of the shear knives.

5. The method according to claim 1, comprising, for adapting the maximum acceleration to a required desired speed of the shear, shifting the starting time of the shear and correspondingly changing an acceleration distance of the shear.

6. The method according to claim 1, comprising, in the case of short acceleration distances, holding the shear knives in a waiting position which is advantageous to heating until shortly prior to the cut.

* * * * *